United States Patent
Muthiah et al.

(10) Patent No.: US 12,111,705 B2
(45) Date of Patent: Oct. 8, 2024

(54) DYNAMICALLY CONTROLLING VARIABLE DATA STORAGE DEVICE THRESHOLD TEMPERATURES WITHIN A STORAGE SYSTEM

(71) Applicant: Western Digital Technologies, Inc., San Jose, CA (US)

(72) Inventors: Ramanathan Muthiah, Bangalore (IN); Sridhar Sabesan, Bangalore (IN); Pavan Gururaj, Bangalore (IN); Dinesh Babu, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 111 days.

(21) Appl. No.: 17/939,537

(22) Filed: Sep. 7, 2022

(65) Prior Publication Data

US 2024/0077921 A1  Mar. 7, 2024

(51) Int. Cl.
*G06F 1/20* (2006.01)
(52) U.S. Cl.
CPC .................................... *G06F 1/206* (2013.01)
(58) Field of Classification Search
CPC ........................................................ G06F 1/206
See application file for complete search history.

(56) References Cited

U.S. PATENT DOCUMENTS

| | | | |
|---|---|---|---|
| 4,860,135 A * | 8/1989 | Cain | G11B 5/5565 |
| 5,732,215 A | 3/1998 | Boutaghou et al. | |
| 8,595,535 B1 | 11/2013 | Tamilarasan et al. | |
| 9,405,356 B1 * | 8/2016 | Sareen | G06F 3/0674 |
| 10,156,987 B1 * | 12/2018 | Gutierrez | G06F 1/3268 |
| 2005/0204175 A1 * | 9/2005 | Burton | G11B 19/046 |
| | | | 713/300 |
| 2008/0270691 A1 | 10/2008 | Belady | |

(Continued)

FOREIGN PATENT DOCUMENTS

KR   20210121686 A   * 10/2021

OTHER PUBLICATIONS

Jiang, Xunfei et al., Thermal Modeling of Hybrid Storage Clusters, J Sign Process Syst, Received: Nov. 2, 2012 / Revised: May 2, 2013 / Accepted: May 29, 2013 / Published online: Jun. 28, 2013, pp. 181-196, vol. 72, Springer Science+Business Media New York.

*Primary Examiner* — Suresh Suryawanshi
(74) *Attorney, Agent, or Firm* — John D. Henkhaus

(57) ABSTRACT

Dynamically determining respective threshold temperatures for data storage devices (DSDs) in a data storage system (DSS) slot involves determining a marginal temperature of a DSD (TMd) based on the difference between a current threshold temperature of a corresponding DSS slot (TTe) and a current temperature value of the DSD (TCd), and raising the current TTe to an updated TTe accordingly, thereby effectively permitting the DSD to operate at temperatures up to the updated TTe. Updating TTe may come after first determining whether the TMd is greater than a lower limit and/or less than an upper limit, both of which are based on an inherent threshold temperature value of the DSD (TTd). This approach can be applied to other DSDs housed in the same DSS enclosure, enabling varying each respective DSD operating temperature, in contrast to using a fixed operating temperature range for the entire enclosure.

20 Claims, 7 Drawing Sheets

(56) References Cited

U.S. PATENT DOCUMENTS

| | | | |
|---|---|---|---|
| 2012/0016533 A1* | 1/2012 | Lim | G11B 19/046 |
| | | | 713/324 |
| 2015/0242130 A1 | 8/2015 | Chang et al. | |
| 2016/0363972 A1* | 12/2016 | McNally | G06F 1/206 |
| 2017/0060202 A1* | 3/2017 | Sundaram | G06F 1/3275 |
| 2020/0050246 A1* | 2/2020 | Karalnik | H05K 1/0203 |
| 2021/0216216 A1 | 7/2021 | Brandt | |
| 2022/0087074 A1* | 3/2022 | Mendonsa | H05K 7/20836 |

\* cited by examiner

DYNAMICALLY CONTROLLING VARIABLE DATA STORAGE DEVICE THRESHOLD TEMPERATURES WITHIN A STORAGE SYSTEM

FIELD OF EMBODIMENTS

Embodiments of the invention may relate generally to data storage systems, and particularly to approaches to dynamically controlling data storage device threshold temperatures within a data storage system.

BACKGROUND

As networked computing systems grow in numbers and capability, there is a need for more storage system capacity. Cloud computing and large-scale data processing further increase the need for digital data storage systems that are capable of transferring and holding significant amounts of data. One approach to providing sufficient data storage in data centers is the use of arrays of data storage devices typically configured and provisioned as one or more data storage systems. Many data storage devices can be housed in an electronics enclosure (sometimes referred to as a "rack"), which is typically a modular unit that can hold and operate independent data storage devices in an array, computer processors, routers and other electronic equipment. Data centers typically include many rack-mountable data storage devices mounted within respective slots of an enclosure and which are used to store the massive amounts of data. Temperature management within such an enclosure is of critical importance to proper and reliable operational capabilities of a data storage system generally and of the constituent data storage devices particularly.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to dynamically controlling temperature thresholds (also referred to as threshold temperatures) for data storage device within a data storage system are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

Figure 2:
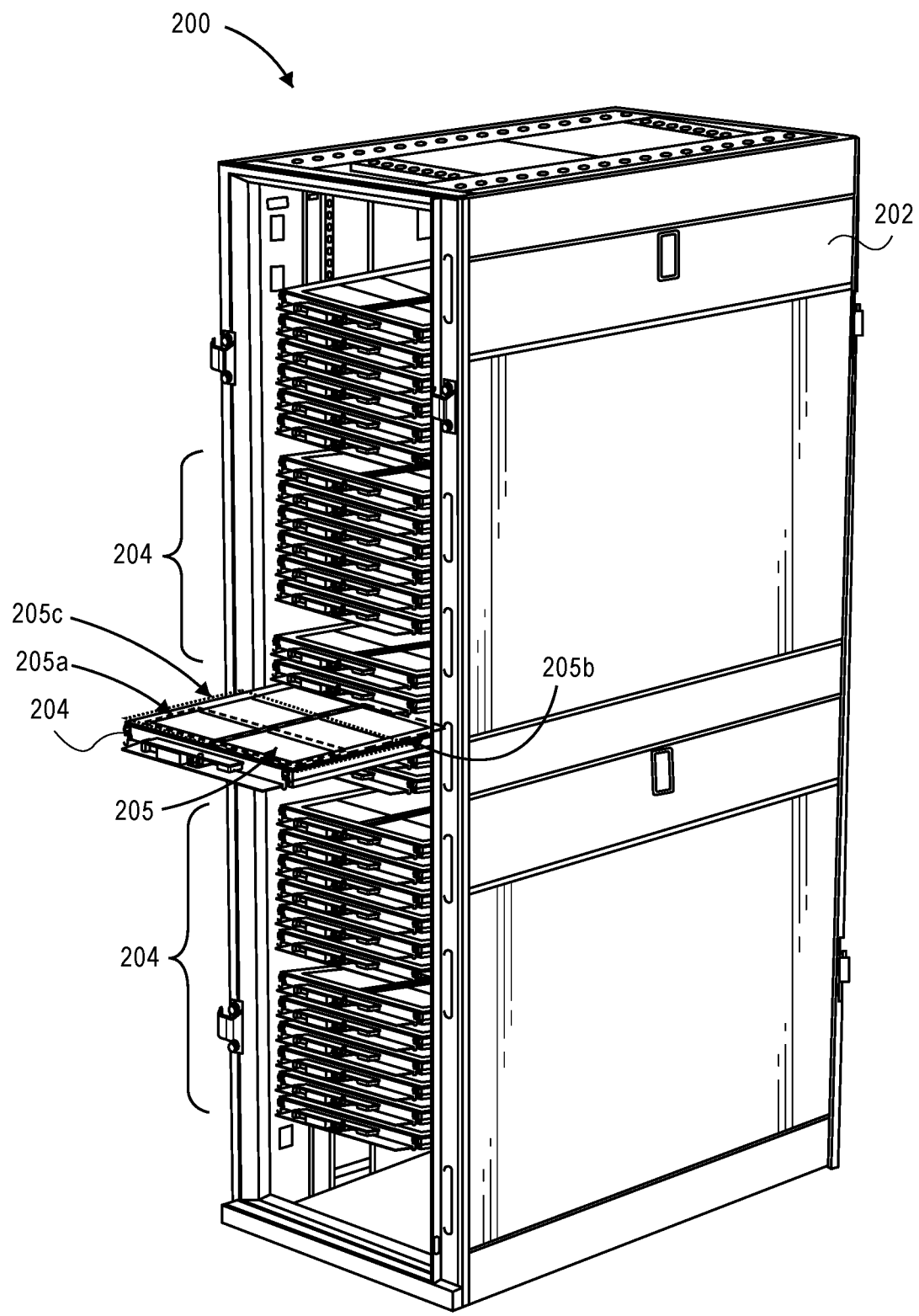
FIG. 2 is a perspective view illustrating a data storage system, according to an embodiment.

Physical Description of an Illustrative Operating Context-Data Storage Systems and Data Centers There is a commercial demand for high-capacity digital data storage systems, in which multiple data storage devices (DSDs), such as hard disk drives (HDDs), solid-state drives (SSDs), tape drives, hybrid drives, and the like are housed in a common enclosure. Data storage systems often include large enclosures that house multiple shelves on which rows of DSDs are mounted. FIG. 2 is a perspective view illustrating one example data storage system, according to embodiments. A data storage system 200 may comprise a system enclosure 202 (or "rack 202"), in which multiple data storage system trays 204 are housed. Each tray 204 may be placed or slid onto a corresponding shelf or rail within the rack 202, for example. Each tray is composed of multiple slots, compartments, mounting spaces (hereinafter, "slot") in which a respective DSD is housed. Typically, a rack 202 further houses a system controller, and may further house switches, storage server(s), application server(s), a power supply, cooling fans, etc. While each tray 204 and constituent DSDs in this example are illustrated as positioned horizontally within the rack 202, DSD trays 204 alternatively may be positioned vertically within a comparable rack. Furthermore, while the techniques described herein may be described in the context of a "slot", e.g., a singular mounting space for a singular DSD, such techniques may be expanded for use in the context of a "slot" that is composed of multiple singular slots, such as a row 205a, a column 205b, a position-based array 205c, and the like.

Generally, a data center (or, generally, "mass storage system") may be likened to an extreme version of a data storage system (or multiple data storage systems working together), along with the power, cooling, space, and the like, needed to operate the storage, management, and sharing of data as well as the corresponding network infrastructure (e.g., routers, switches, firewalls, application-delivery controllers, and the like). Expanding on that notion, a "hyperscale" data center generally refers to a facility providing robust, scalable applications and storage services to individuals or other businesses. Exemplary implementations of hyperscale computing include cloud and big data storage, web service and social media platforms, enterprise data centers, and the like, which may consist of thousands of servers linked by an ultra-high speed fiber network. Because businesses depend on the constant functionality of all sizes and forms of data centers, the availability and reliability of a data center are paramount concerns.

Figure 3:
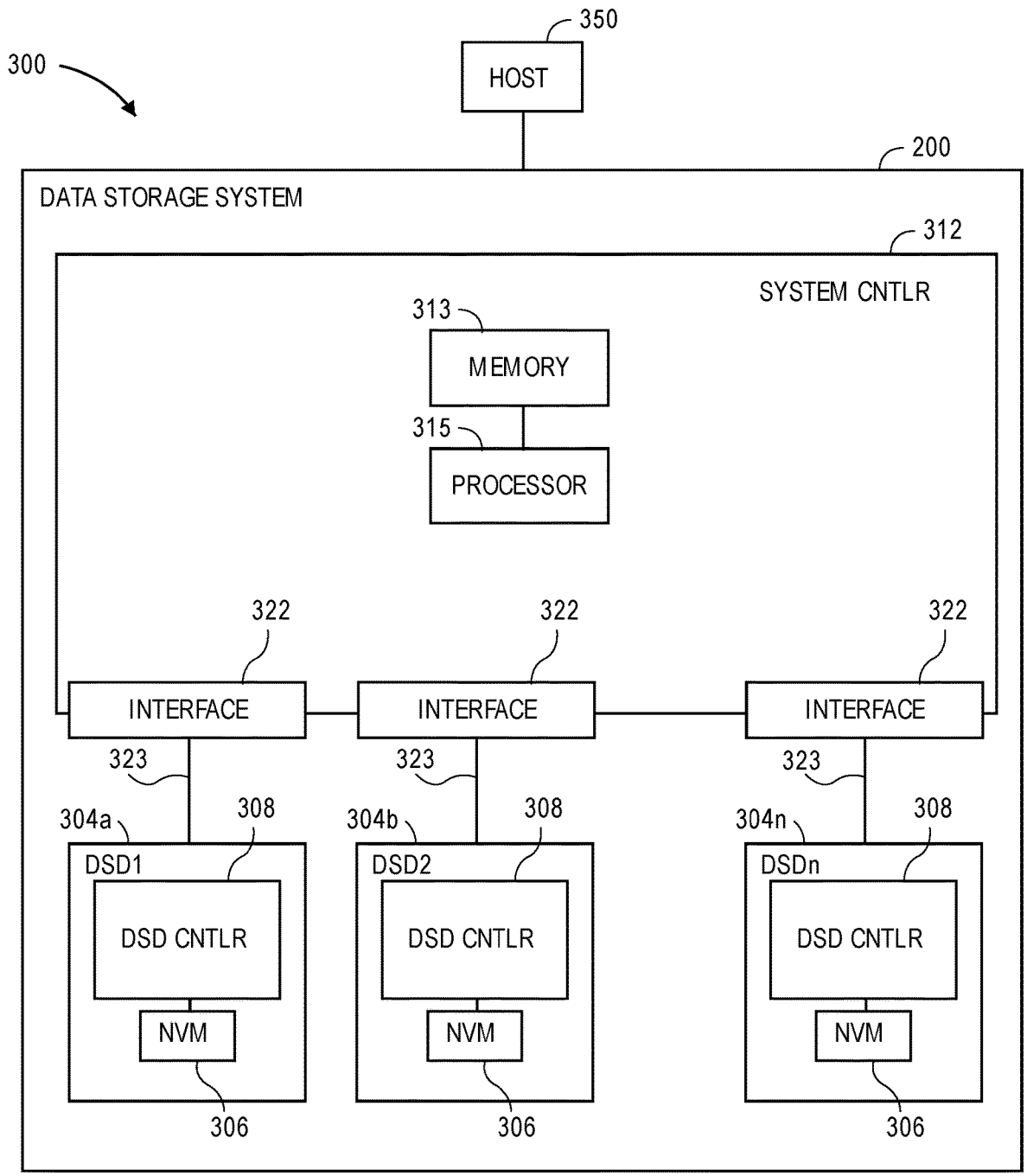
FIG. 3 is a block diagram illustrating a data storage system architecture, according to an embodiment

An example data storage system may comprise multiple DSDs such as HDDs and/or SSDs, each communicative with and under the control of a system controller via a communication interface according to a corresponding communication protocol. FIG. 3 is a block diagram illustrating a data storage system architecture, according to an embodiment. Example architecture 300 illustrates a data storage system 200 that comprises multiple data storage devices (DSDs) 304a (DSD1), 304b (DSD2), and 304n (DSDn), where n represents an arbitrary number of DSDs (e.g., HDDs and/or SSDs) that may vary from implementation to implementation. Each DSD 304a-304n is communicative with and under the control of a data storage system controller 312, via a communication interface 322 according to a corresponding communication protocol 323. Each DSD 304a-304n includes corresponding non-volatile memory (NVM) 306 (e.g., typically in the form of spinning magnetic disk media such as recording medium 120 of FIG. 1A in the case of HDDs, or electronic non-volatile memory such as non-volatile memory components 170a-170n of FIG. 1B in the case of SSDs) controlled by a respective DSD controller 308. The system controller 312 of data storage system 200 includes at least a memory 313 and a processor 315.

Processing, functions, procedures, actions, method steps, and the like, that are described herein as being performed or performable by system controller 312, or by a DSD 304a-304n, may include enactment by execution of one or more sequences of instructions stored in one or more memory units and which, when executed by one or more processors, cause such performance. For example, and according to an embodiment, the system controller 312 comprises an application-specific integrated circuit (ASIC) comprising at least one memory unit (e.g., memory 313) for storing such instructions (such as firmware, for a non-limiting example) and at least one processor (e.g., processor 315) for executing such instructions, enabling dynamically controlling threshold temperatures for DSDs within a data storage system (DSS), generally, and within a DSS slot, more particularly. More broadly, system controller 312 may be embodied in any form of and/or combination of software, hardware, and firmware. An electronic controller in this context typically includes circuitry such as one or more processors for executing instructions, and may be implemented as a System On a Chip (SoC) electronic circuitry, which may include a memory, a microcontroller, a Digital Signal Processor (DSP), an ASIC, a Field Programmable Gate Array (FPGA), hard-wired logic, analog circuitry and/or a combination thereof, for non-limiting examples. Firmware, i.e., executable logic which may be stored in controller memory 313, includes machine-executable instructions for execution by the controller 312 in operating DSS 200.

The data storage system 200 may be communicatively coupled with a host 350, which may be embodied in a hardware machine on which executable code executes (for non-limiting examples, a computer or hardware server, and the like), or as software instructions executable by one or more processors (for non-limiting examples, a software server such as a database server, application server, media server, and the like). Host 350 generally represents a client of the data storage system 200, and has the capability to make read and write requests (input/output or "I/O") to the data storage system 200. Note that the system controller 312 may also be referred to as a "host" because the term is often generally used in reference to any device that makes I/O calls to a data storage device or an array of devices, such as DSDs 304a-304n. Host 350 interacts with one or more DSDs 304a-304n via the interface 322 (e.g., an I/O interface) for transferring data to and from the DSDs 304a-304n, such as via a bus or network such as Ethernet or Wi-Fi or a bus standard such as Serial Advanced Technology Attachment (SATA), PCI (Peripheral Component Interconnect) express (PCIe), Small Computer System Interface (SCSI), or Serial Attached SCSI (SAS), for non-limiting examples.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that a common challenge associated with operating a mass storage system is the management of temperatures within the system. Storage device and storage system temperature management functions typically rely upon temperature sensors, control logic and algorithms, and airflow/cooling means internal and/or external to the storage device or storage system. Common approaches to temperature management within storage enclosures (e.g., JBOD (Just a Bunch of Disks)/JBOF (Just a Bunch of Flash) enclosures) employ a static thermal cut-off point that is lower than the actual operating temperature threshold of the storage device (or simply "drive"), i.e., a point at which I/O (input/output) operational access to the drive is no longer provided or permitted. For example, most of the enclosures known in the current market use a static threshold temperature (i.e., 60° C.), while most of the drives have an actual operating range (e.g., established by the manufacturer) up to 70° C. Thus, in current scenarios in which the drive temperature is set to a lower value than the actual drive cut-off temperature, i.e., based on system enclosure temperature control parameters, that drive will not reach the maximum (and/or minimum) temperature(s) at which the drive can actually safely and continuously operate. Furthermore in such scenarios temperature management parameters are generalized across the enclosure and, therefore, responsive to one drive reaching the common fixed threshold temperature then all the drives would be deemed inaccessible. Consequently, existing implementations are operationally limited by use of a fixed operating temperature regardless of the actual operating environments. While airflows to the devices within servers/enclosures have been modified, and various thermal algorithms are in practice within the storage industry, available operational capabilities are still limited by such approaches to per-enclosure temperature management.

Per-Slot Variable Threshold Temperatures

Processing, functions, procedures, actions, method steps, and the like, that are described herein may include enactment by execution of one or more sequences of one or more instructions stored in one or more memory units and which, when executed by one or more processors, cause such performance. Referenced controllers may be embodied in any form of and/or combination of software, hardware, and firmware, such as an application-specific integrated circuit (ASIC) comprising at least one memory unit for storing such instructions and at least one processor for executing such instructions.

Figure 4:
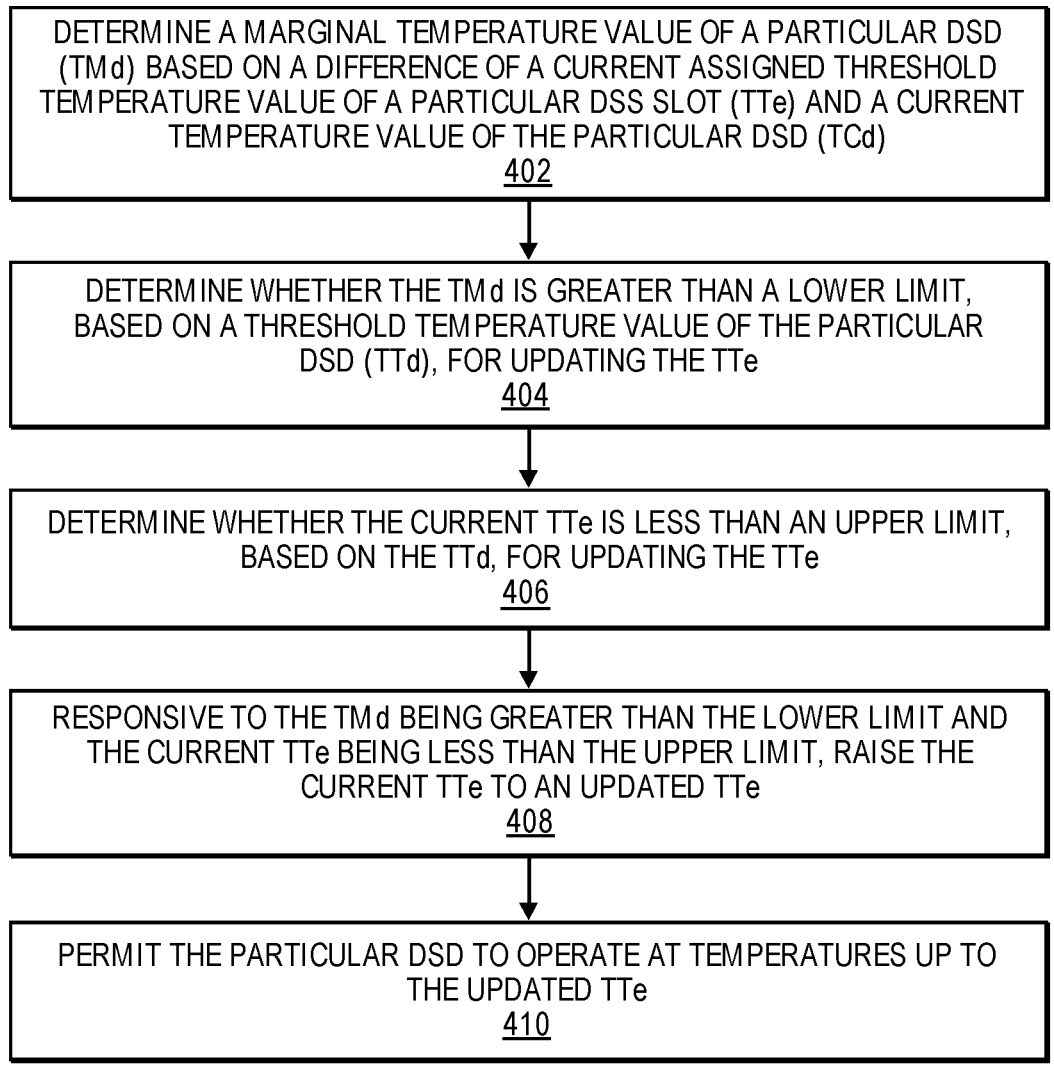
FIG. 4 is a flow diagram illustrating a method for dynamically determining a threshold temperature for a data storage device positioned in a data storage system slot, according to an embodiment.

FIG. 4 is a flow diagram illustrating a method for dynamically determining a threshold temperature for a data storage device (DSD) positioned in a data storage system (DSS) slot, according to an embodiment. The computing process or procedure of FIG. 4 may be implemented for execution as one or more sequences of one or more instructions stored in one or more memory units and which, when executed by one or more processors, cause performance of the process.

At block 402, determine a marginal temperature value of a particular DSD (TMd) based on a difference of a current assigned threshold temperature value of a particular DSS slot (TTe) and a current temperature value of the particular DSD (TCd). For example, compute TMd=TTe−TCd, which represents the available DSD temperature margin by indicating the difference between the current DSD temperature and the current upper limit temperature for the DSS slot in which the DSD is mounted. Here, the current DSS slot threshold temperature value (TTe) is assigned and known by the system controller 312 (FIG. 3) as it is likely a metric under the control and management of the system controller 312 for data storage system 200 (FIGS. 2-3) temperature management purposes. Here also, the current temperature value of the particular DSD (TCd), such as any of DSDs 304a-304n (FIG. 3), can be polled from a number of known sources according to the system environment. For example, for an HDD/SSD in a standalone environment (e.g., server, laptop, workstation, IT equipment, and the like), responsive to powering on the devices the initiator can get the target capabilities like mode pages, mode sense, power capabilities, etc. and, as part of mode pages, sensor related information is be shared with the initiator and the target threshold is fetched. According to an embodiment, after a consistent drive temperature TCd is monitored for a certain period of time, the dynamic threshold temperature procedure(s) (e.g., FIGS. 4-5) initiates, which may lead to the posting of a new threshold to the initiator or other management service. For other examples, in a JBOD/JBOF scenario a service such as SES (SCSI (Small Computer System Interface) Enclosure Services) may provide TCd and/or TTe data, and in server scenarios a BMC (Baseboard Management Controller) may provide TCd and/or TTe data.

At block 404, determine whether the TMd is greater than a lower limit, based on a threshold temperature value of the particular DSD (TTd), for updating the TTe. For example, a variable characterizing a certain pre-determined percentage of the DSD's threshold temperature (TTd) may be computed, i.e., a lower limit beyond which varying/updating the TTe is of marginal value and it is considered prudent to maintain the current TTe value.

At block 406, determine whether the current TTe is less than an upper limit, based on the TTd, for updating the TTe. For example, a variable characterizing a certain pre-determined percentage of the DSD's threshold temperature (TTd) may be computed, i.e., an upper limit beyond which varying/updating the TTe is considered risky to the reliability of the DSD, in that it may not be prudent to operate the DSD at a temperature so close to the established (e.g., by the manufacturer) drive threshold temperature at which it can safely operate over an extended period so as to avoid overheating the device or various constituent components.

At block 408, responsive to the TMd being greater than the lower limit (at block 404) and the current TTe being less than the upper limit (at block 406), raise the current TTe to an updated TTe. For example, the current TTe may be incremented by a certain pre-determined percentage of the TCd to arrive at the updated TTe, enabling incremental steps toward the DSDs upper temperature limit. Hence, at (optional) block 410, the particular DSS slot (and therefore by extension the particular DSD positioned therein) can be assigned (e.g., associated with, in firmware or other executable logic/algorithms, for example) the updated TTe, whereby the particular DSD is permitted (e.g., input/output operational access to the DSD is allowed) to operate at temperatures up to the updated TTe. According to an embodiment, it is further determined whether the updated TTe is less than the upper limit, and only responsive to that determination is the updated TTe assigned to the corresponding particular DSS slot and likewise the particular DSD being allowed/permitted to operate accordingly up to the updated TTe.

With respect to low-temperature thresholds and according to an embodiment, responsive to determining that the marginal temperature value of the particular DSD (TMd) is less than a low-temperature threshold value of a particular DSS slot ($TTe_{low}$), or within a certain percentage thereof, a corresponding one or more fields in a SES protocol is updated and/or a BMC service is notified about the $TTe_u$. Consequently, for example, the management service may choose to responsively lower the RPM of one or more cooling fan or, in a case in which the DSD is in an idle state then the state may be changed to active so that the power consumption increases thereby correspondingly increasing the overall DSD temperature.

According to an embodiment, the method of FIG. 4 can be applied to one or more other DSDs (e.g., HDDs, SSDs, and/or a combination of both) in the same storage array enclosure, thereby generating a respective updated TTe ($TTe_{1-n}$) corresponding to each other DSD to which the procedure is applied. Hence, the described procedure enables varying each respective DSD operating temperature according to the environment in which the DSD is located. Instead of a fixed operating temperature range for the entire DSS enclosure based on a generalized DSS enclosure slot threshold (TTe), DSD fail-safe operating temperatures can be widened, thereby providing broader control over the ultimate operating temperature of each DSD anywhere it may be positioned within the enclosure. Here, each DSD can operate under a different threshold temperature (e.g., $TTe_i \neq TTe_j$), which enables operational accessibility to at least some DSDs in the DSS even though one or more other DSDs may have exceeded a generalized TTe and/or a respective particular TTe or TTd. Since drive threshold temperatures are set dynamically across slots, the same enclosure can advantageously be used in various locations.

As temperature control and management is an important aspect in the design of a data storage system, enabling the usage in various operating environments (e.g., any of an edge location, a cold environment, a temperature-controlled data center, for non-limiting examples) via the foregoing temperature controlling approach(es) can provide advantageous flexibility with respect to the types, forms, capacities, and the like of storage devices employed while still maintaining fail-safe temperature margins, the storage systems in which they are employed (e.g., a system is populated over time), and the positions within the system enclosure at which various devices are mounted (e.g., cooler versus warmer), for example. For example, in scenarios in which DSDs having different capacities and/or different models are deployed in a given storage system, the DSDs tend to have different temperature thresholds. Thus, by employing the described dynamic temperature approach, each slot in the enclosure can operate under a different threshold temperature according to the max threshold of the corresponding DSD, thereby enabling increased uptime and performance in high-workload and high-temperature environments. Furthermore, responsive to a DSD reporting its temperature to services like SES or any other service, the management services can enhance their existing thermal algorithm for more dynamic cooling changes with respect to fan RPM (revolutions per minute) control and air flow to various portions of the DSS enclosure.

Figure 5A:
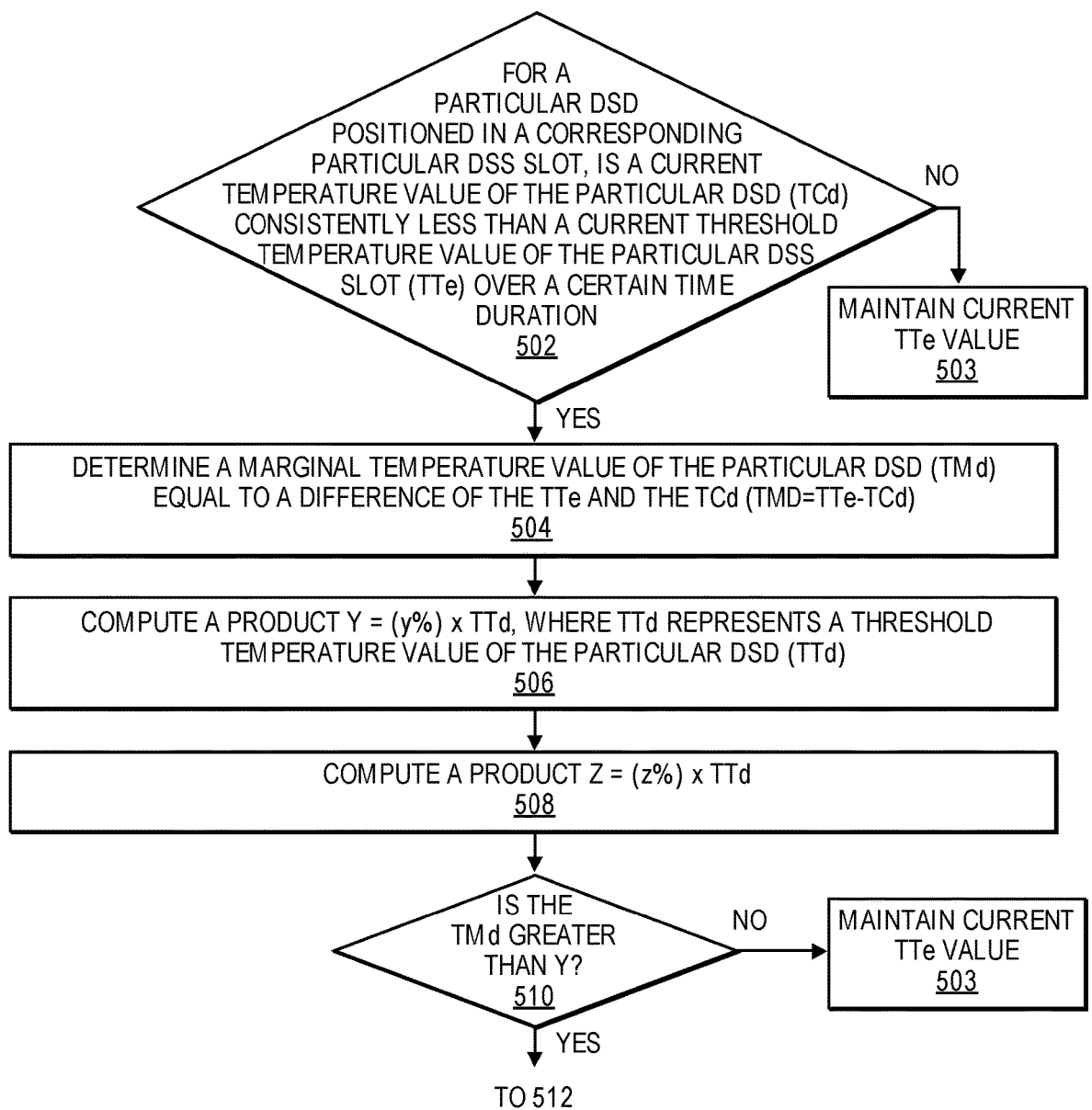
FIGS. 5A-5B are a flow diagram illustrating a method for method for dynamically varying threshold temperatures for data storage devices positioned in data storage system slots, according to an embodiment.
Figure 5B:
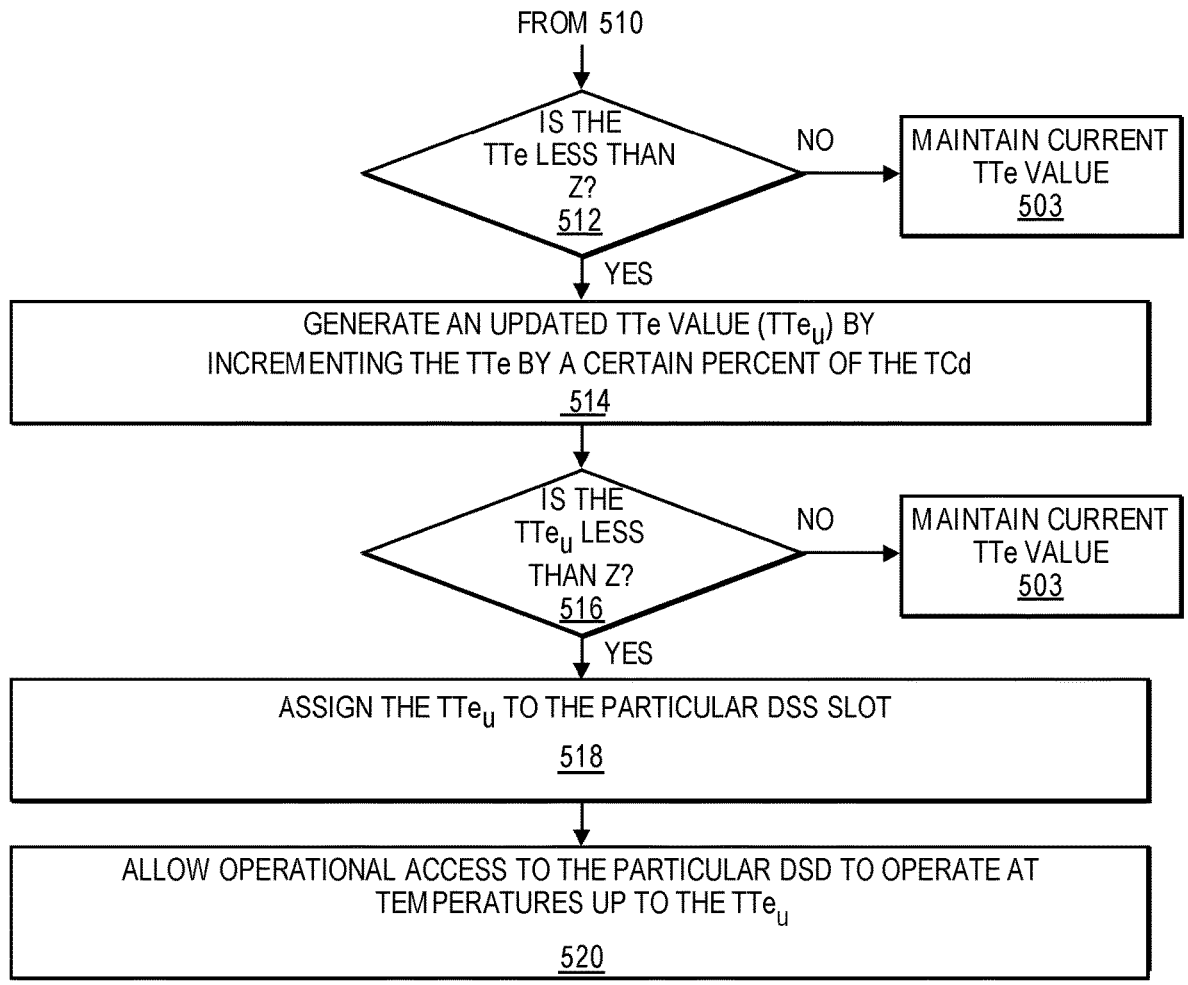

FIGS. 5A-5B are a flow diagram illustrating a method for method for dynamically varying threshold temperatures for data storage devices positioned in data storage system slots, according to an embodiment. The computing process or procedure of FIGS. 5A-5B may be implemented for execution as one or more sequences of one or more instructions stored in one or more memory units and which, when executed by one or more processors, cause performance of the process.

At decision block 502, for a particular DSD positioned in a corresponding particular DSS slot, determine whether a current temperature value of the particular DSD (TCd) consistently less than a current threshold temperature value of the particular DSS slot (TTe) over a certain time duration. For example, upon polling and/or monitoring the temperature of the particular DSD over a certain period of time and determining therefrom that the DSD temperature TCd has remained consistently less than the slot threshold TTe over that period, then control moves on to block 504. Otherwise, the current TTe value is maintained at block 503.

At block 504, determine a marginal temperature value of the particular DSD (TMd) equal to a difference of the TTe and the TCd. For example, compute TMd=TTe−TCd, which represents the available DSD temperature margin by indicating the difference between the current DSD temperature and the current upper limit temperature for the DSS slot in which the DSD is mounted. Reference is made to block 402 of FIG. 4 for a further description regarding this block 504.

At block 506, compute a product Y=(y %)×TTd, where TTd represents a threshold temperature value of the particular DSD (TTd). For example, variable Y characterizing a certain pre-determined percentage (e.g., y=15%, for a non-limiting example) of the DSD's threshold temperature (TTd) is computed, i.e., a lower limit beyond which varying/updating the TTe is of marginal value.

At block 508, compute a product Z=(z %)×TTd. For example, a variable Z characterizing a certain pre-determined percentage (e.g., z=90%, for a non-limiting example) of the DSD's threshold temperature (TTd) is computed, i.e., an upper limit beyond which varying/updating the TTe is considered risky to the DSD.

At decision block 510, determine whether the TMd is greater than Y. Here, variable Y represents a lower limit beyond which varying/updating the TTe is of marginal value and it is considered prudent to maintain the current TTe value. Hence, responsive to the TMd exceeding the lower limit Y, then control moves on to decision block 512. Otherwise, the current TTe value is maintained at block 503.

At decision block 512, determine whether the TTe is less than Z. Here, variable Z represents an upper limit beyond which varying/updating the TTe is considered risky to the DSD in that it is not considered prudent to operate the DSD at a temperature so close to the ultimate drive threshold temperature (e.g., established by the manufacturer and typically according to specification) at which it can safely operate over an extended period, so as to avoid overheating the device or various constituent components. Hence, responsive to the TTe being less than the upper limit X, then control moves on to block 514. Otherwise, the current TTe value is maintained at block 503.

At block 514, effectively responsive to the TMd being greater than Y (at block 510) and the TTe being less than Z (at block 512), generate an updated TTe value ($TTe_u$) by incrementing the TTe by a certain percent of the TCd. For example, the current TTe may be incremented by 5% of the TCd to arrive at the updated $TTe_u$, enabling incremental steps toward the DSDs upper temperature limit.

At decision block 516, determine whether the $TTe_u$ is less than Z. Because the variable Z represents the upper limit beyond which varying/updating the TTe is considered risky to the DSD, to maintain a margin of safety (e.g., fail-safe tolerance) to avoid overheating the device the updated $TTe_u$ (from block 514) is compared to this safe upper limit. While the updated $TTe_u$ is generated previously, it is not yet assigned to the particular DSD prior to this stage. Here, responsive to the updated $TTe_u$ being less than the upper limit Z, then control moves on to block 518. Otherwise, the current TTe value is maintained at block 503.

At block 518, effectively responsive to $TTe_u$ being less than Z, assign the $TTe_u$ to the particular DSS slot. For example, the particular DSS slot (and likewise by extension the particular DSD positioned therein) can be assigned (e.g., associated with, in firmware or other executable logic/algorithms, for example) the $TTe_u$, whereby the particular DSD is permitted (e.g., input/output operational access to the DSD is allowed) to operate at temperatures up to the $TTe_u$.

At block 520, allow operational access to the particular DSD to operate at temperatures up to the $TTe_u$. For example, in addition to logically assigning the $TTe_u$ the particular DSS slot with respect to system controller 312 (FIG. 3) logic, system controller 312 further allows or permits the host 350 (FIG. 3) operational (e.g., I/O) access to the particular DSD while the particular DSD is able to operate at temperatures up to the $TTe_u$.

As with the method of FIG. 4, according to an embodiment, here too the method of FIGS. 5A-5B can be applied to one or more other DSDs (e.g., HDDs, SSDs, and/or a combination of both) in the same storage array enclosure, thereby generating a respective updated $TTe_u$, ($TTe_{1-n}$) corresponding to each other DSD to which the procedure is applied. Here again, instead of a fixed operating temperature range for the entire DSS enclosure based on a generalized DSS enclosure slot threshold (TTe), DSD fail-safe operating temperatures can be widened, thereby providing broader control over the ultimate operating temperature of each DSD anywhere it may be positioned within the enclosure and enabling each DSD to operate under a different threshold temperature (e.g., $TTe_u \neq TTe_i$), which in turn enables operational accessibility to at least some DSDs in the DSS even though one or more other DSDs may have exceeded a generalized TTe and/or a respective particular TTe or TTd.

Hard Disk Drive Configuration

As discussed, embodiments may be used in the context of a data storage system in which multiple data storage devices (DSDs) including hard disk drives (HDDs) are employed. Thus, in accordance with an embodiment, a plan view illustrating an HDD 100 is shown in FIG. 1A to illustrate exemplary operating components.

Figure 1A:
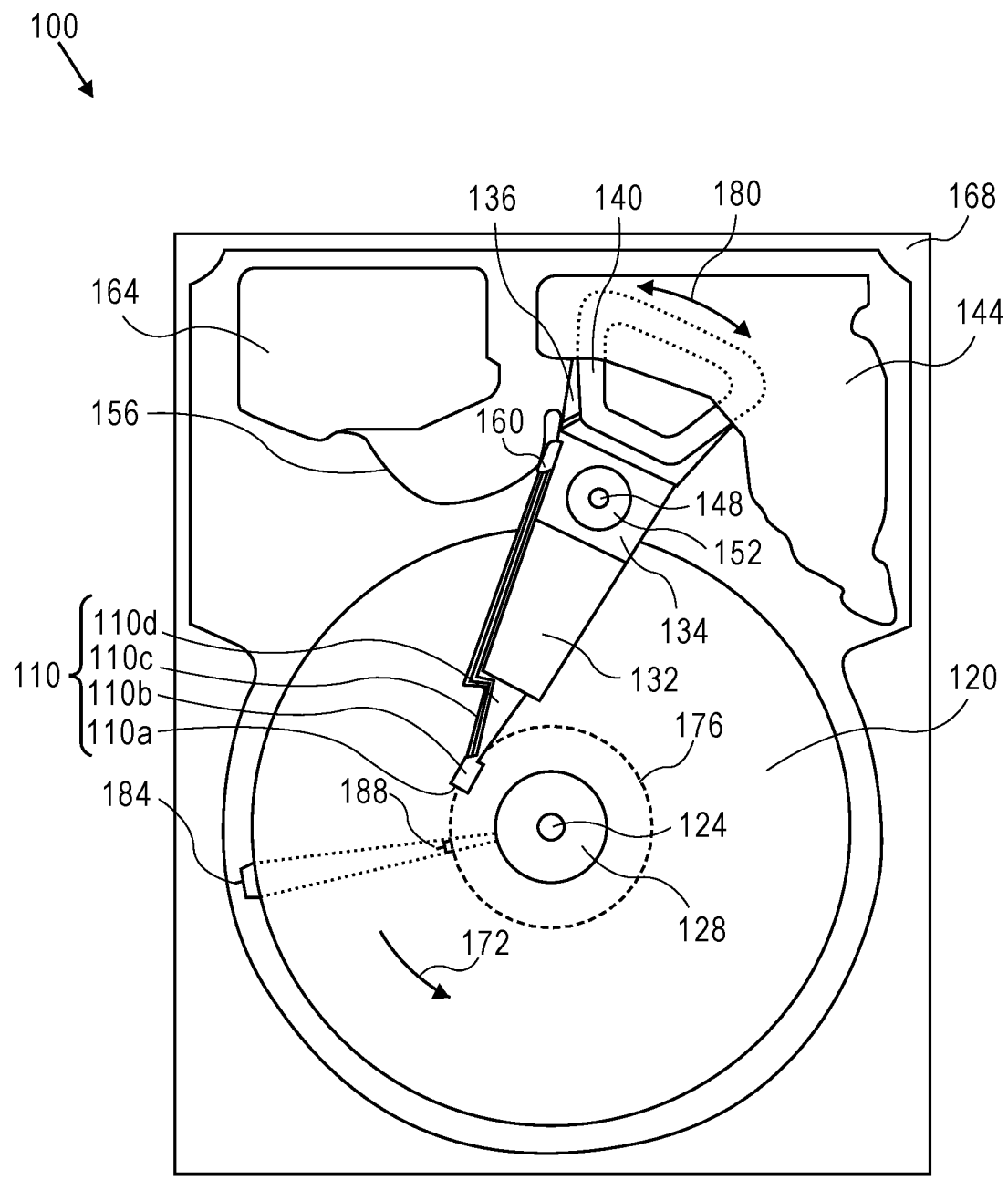
FIG. 1A is a plan view illustrating a hard disk drive (HDD), according to an embodiment.

FIG. 1A illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Solid State Drive Configuration

Figure 1B:
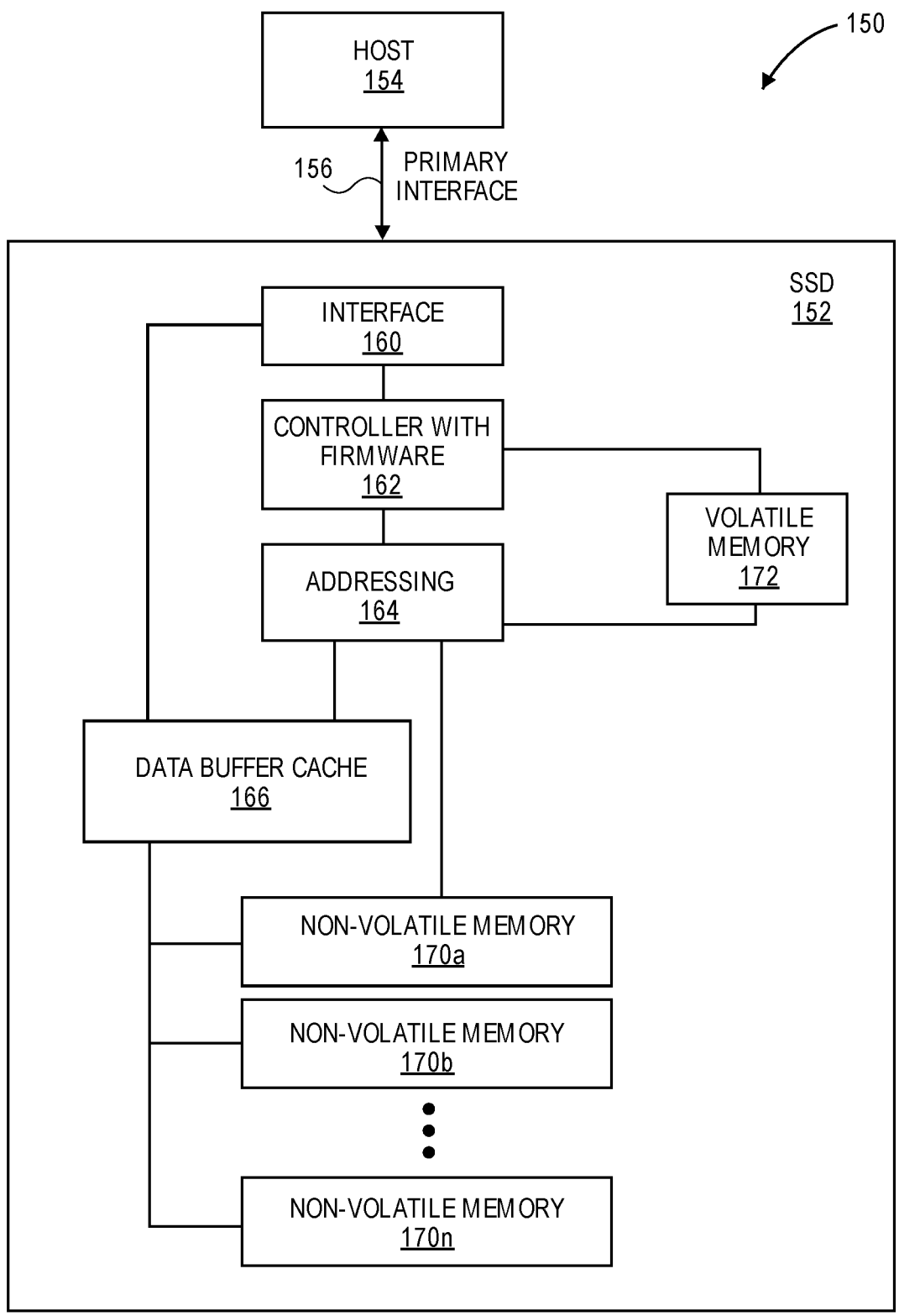
FIG. 1B is a block diagram illustrating a solid-state drive (SSD), according to an embodiment.

As discussed, embodiments may be used in the context of a data storage system in which multiple data storage devices (DSDs) including solid-state drives (SSDs) are employed. Thus, FIG. 1B is a block diagram illustrating an example operating context with which embodiments of the invention may be implemented. FIG. 1B illustrates a generic SSD architecture 150, with an SSD 152 communicatively coupled with a host 154 through a primary communication interface 156. Embodiments are not limited to a configuration as depicted in FIG. 1B, rather, embodiments may be implemented with SSD configurations other than that illustrated in FIG. 1B. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O requests or calls to one or more memory device. For example, host 154 may be an operating system executing on a computer, a tablet, a mobile phone, or generally any type of computing device that contains or interacts with memory, such as host 350 (FIG. 3). The primary interface 156 coupling host 154 to SSD 152 may be, for example, a storage system's internal bus or a communication cable or a wireless communication link, or the like.

The example SSD 152 illustrated in FIG. 1B includes an interface 160, a controller 162 (e.g., a controller having firmware logic therein), an addressing 164 function block, data buffer cache 166, and one or more non-volatile memory components 170a, 170b-170n.

Interface 160 is a point of interaction between components, namely SSD 152 and host 154 in this context, and is applicable at the level of both hardware and software. This enables a component to communicate with other components via an input/output (I/O) system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 152 includes a controller 162, which incorporates the electronics that bridge the non-volatile memory components (e.g., NAND (NOT-AND) flash) to the host, such as non-volatile memory 170a, 170b, 170n to host 154. The controller is typically an embedded processor that executes firmware-level code and is an important factor in SSD performance.

Controller 162 interfaces with non-volatile memory 170a, 170b, 170n via an addressing 164 function block. The addressing 164 function operates, for example, to manage mappings between logical block addresses (LBAs) from the host 154 to a corresponding physical block address on the SSD 152, namely, on the non-volatile memory 170a, 170b, 170n of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 172, such as DRAM (dynamic random-access memory) or some other local volatile memory component accessible to controller 162 and addressing 164. Alternatively, the table structure may be maintained more persistently across sessions in the SSD's non-volatile memory such as non-volatile memory 170a, 170b-170n.

Addressing 164 interacts with data buffer cache 166, in addition to non-volatile memory 170a, 170b-170n. Data buffer cache 166 of an SSD 152 typically uses DRAM as a cache, similar to the cache in hard disk drives. Data buffer cache 166 serves as a buffer or staging area for the transmission of data to and from the non-volatile memory components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes one or more non-volatile memory 170a, 170b-170n components. For a non-limiting example, the non-volatile memory components 170a, 170b-170n may be implemented as flash memory (e.g., NAND or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the hard disks in hard-disk drive (HDD) storage devices.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD (see, e.g., HDD 100) combined with an SSD (see, e.g., SSD 150) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for dynamically determining a threshold temperature for a data storage device (DSD) positioned in a data storage system (DSS) slot, the method comprising:
   determining a marginal temperature value of a particular DSD (TMd) based on a difference of a current assigned threshold temperature value of a particular DSS slot (TTe) and a current temperature value of the particular DSD (TCd);
   determining whether the TMd is greater than a lower limit, based on a threshold temperature value of the particular DSD (TTd), for updating the TTe;
   determining whether the current TTe is less than an upper limit, based on the TTd, for updating the TTe; and
   responsive to the TMd being greater than the lower limit and the current TTe being less than the upper limit, raising the current TTe to an updated TTe.

2. The method of claim 1, further comprising:
   permitting the particular DSD to operate at temperatures up to the updated TTe.

3. The method of claim 1, further comprising:
   assigning the updated TTe to the particular DSS slot.

4. The method of claim 1, further comprising:
   determining whether the updated TTe is less than the upper limit; and
   responsive to the updated TTe being less than the upper limit, assigning the updated TTe to the particular DSS slot.

5. The method of claim 4, further comprising:
   permitting the particular DSD to operate at temperatures up to the updated TTe.

6. The method of claim 1, further comprising:
   for another DSD positioned in a corresponding other DSS slot:
      determining a marginal temperature value of the other DSD ($TMd_1$) based on a difference of a current assigned threshold temperature value of the other DSS slot ($TTe_1$) and a current temperature value of the other DSD ($TCd_1$);
      determining whether the $TMd_1$ is greater than another corresponding lower limit, based on a threshold temperature value of the other DSD ($TTd_1$), for updating the $TTe_1$;
      determining whether the current $TTe_1$ is less than another corresponding upper limit, based on the $TTd_1$, for updating the $TTe_1$;
      responsive to the $TMd_1$ being greater than the other corresponding lower limit and the current $TTe_1$ being less than the other corresponding upper limit, raising the current $TTe_1$ to an updated $TTe_1$; and
      permitting the other DSD to operate at temperatures up to the updated $TTe_1$.

7. The method of claim 6, wherein the updated $TTe_1$ is a different value from the updated TTe.

8. The method of claim 6, wherein one of the particular DSD and the other DSD is a hard disk drive and the other of the particular DSD and the other DSD is a solid-state drive.

9. The method of claim 6, wherein responsive to the TCd exceeding the TTe, continuing permitting the other DSD to operate at temperatures up to the updated $TTe_1$.

10. The method of claim 1, wherein the current TTe corresponds to a high-temperature threshold, the method further comprising:
    determining that the marginal temperature value of the particular DSD (TMd) is less than a low-temperature threshold value of a particular DSS slot ($TTe_{low}$); and
    responsively updating a corresponding one or more fields in a SCSI (Small Computer System Interface) Enclosure Services (SES) protocol and/or notifying a Baseboard Management Controller (BMC) service about the updated TTe.

11. A method for dynamically varying threshold temperatures for data storage devices (DSDs) positioned in data storage system (DSS) slots, the method comprising:
    for a particular DSD positioned in a corresponding particular DSS slot:
       determining a marginal temperature value of the particular DSD (TMd) equal to a difference of a current threshold temperature value of the particular DSS slot (TTe) and a current temperature value of the particular DSD (TCd);
       computing a product Y=(y %)×TTd, where TTd represents a threshold temperature value of the particular DSD (TTd);
       computing a product Z=(z %)×TTd;
       determining whether the TMd is greater than Y;
       responsive to the TMd being greater than Y, determining whether the TTe is less than Z; and
       responsive to TTe being less than Z, generating an updated TTe value ($TTe_u$) by incrementing the TTe by a certain percent of the TCd.

12. The method of claim 11, further comprising:
    permitting the particular DSD to operate at temperatures up to the $TTe_u$.

13. The method of claim 11, further comprising:
    determining whether the $TTe_u$ is less than Z;
    responsive to $TTe_u$ being less than Z, assigning the $TTe_u$ to the particular DSS slot; and
    allowing operational access to the particular DSD to operate at temperatures up to the $TTe_u$.

14. The method of claim 11, further comprising:
prior to determining TMd, determining whether TCd is consistently less than TTe over a certain time duration.

15. The method of claim 11, further comprising:
for another DSD positioned in a corresponding other DSS slot:
  determining a marginal temperature value of the other DSD ($TMd_1$) equal to a difference of a current threshold temperature value of the other DSS slot ($TTe_1$) and a current temperature value of the other DSD ($TCd_1$);
  computing a first percentage value of a threshold temperature value of the other DSD ($TTd_1$);
  computing a second percentage value of the $TTd_1$;
  determining whether the $TMd_1$ is greater than the first percentage value of the $TTd_1$;
  determining whether the $TTe_1$ is less than the second percentage value of the $TTd_1$;
  responsive to the $TMd_1$ being greater than the first percentage value and the $TTe_1$ being less than the second percentage value, updating the $TTe_1$ based on the $TCd_1$; and
  permitting the other DSD to operate at temperatures up to the updated $TTe_1$;
wherein the updated $TTe_1$ is a different value from the $TTe_u$.

16. The method of claim 15, further comprising:
responsive to the particular DSD exceeding the corresponding $TTe_u$, prohibiting I/O (input/output) operational access to the particular DSD while continuing to permit the other DSD to operate at temperatures up to the corresponding updated $TTe_1$.

17. The method of claim 15, wherein one of the particular DSD and the other DSD is a hard disk drive and the other of the particular DSD and the other DSD is a solid-state drive.

18. An electronic controller for a data storage system comprising a data storage device (DSD) positioned in a data storage system (DSS) slot, the controller comprising:
  means for executing machine-executable instructions;
  means for storing one or more sequences of machine-executable instructions which, when executed by the means for executing, cause performance of:
    determining a marginal temperature value of a particular DSD (TMd) based on a difference of a current assigned threshold temperature value of a particular DSS slot (TTe) and a current temperature value of the particular DSD (TCd);
    determining whether the TMd is greater than a lower limit, based on a threshold temperature value of the particular DSD (TTd), for updating the TTe;
    determining whether the current TTe is less than an upper limit, based on the TTd, for updating the TTe;
    responsive to the TMd being greater than the lower limit and the current TTe being less than the upper limit, raising the current TTe to an updated TTe; and
    permitting the particular DSD to operate at temperatures up to the updated TTe.

19. The electronic controller of claim 18, wherein the one or more sequences of machine-executable instructions, when executed by the means for executing, cause further performance of:
for another DSD positioned in a corresponding other DSS slot:
  determining a marginal temperature value of the other DSD ($TMd_1$) based on a difference of a current assigned threshold temperature value of the other DSS slot ($TTe_1$) and a current temperature value of the other DSD ($TCd_1$);
  determining whether the $TMd_1$ is greater than another corresponding lower limit, based on a threshold temperature value of the other DSD ($TTd_1$), for updating the $TTe_1$;
  determining whether the current $TTe_1$ is less than another corresponding upper limit, based on the $TTd_1$, for updating the $TTe_1$;
  responsive to the $TMd_1$ being greater than the other corresponding lower limit and the current $TTe_1$ being less than the other corresponding upper limit, raising the current $TTe_1$ to an updated $TTe_1$; and
  permitting the other DSD to operate at temperatures up to the updated $TTe_1$;
wherein the updated $TTe_1$ is a different value from the updated TTe.

20. The electronic controller of claim 18, wherein the one or more sequences of machine-executable instructions, when executed by the means for executing, cause further performance of:
  assigning the updated TTe to the particular DSS slot; and
  updating a corresponding one or more fields in a SCSI (Small Computer System Interface) Enclosure Services (SES) protocol and/or notifying a Baseboard Management Controller (BMC) service about the updated TTe.

* * * * *